United States Patent
Hsu

(10) Patent No.: US 8,250,409 B2
(45) Date of Patent: Aug. 21, 2012

(54) BOOT TEST APPARATUS AND METHOD OF COMPUTER SYSTEM

(75) Inventor: Ming-Yuan Hsu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/880,166

(22) Filed: Sep. 13, 2010

(65) Prior Publication Data

US 2011/0264957 A1    Oct. 27, 2011

(30) Foreign Application Priority Data

Apr. 26, 2010    (TW) .............................. 99113008 A

(51) Int. Cl.
*G06F 11/00* (2006.01)

(52) U.S. Cl. .................. 714/36; 714/10; 714/23; 713/2

(58) Field of Classification Search ............. 714/10, 714/23, 25, 30, 31, 32, 36; 713/1, 2, 310
See application file for complete search history.

(56) References Cited

U.S. PATENT DOCUMENTS

| 6,061,811 | A  | * | 5/2000 | Bondi et al. ................... 714/30 |
| 6,839,853 | B2 | * | 1/2005 | Odaohhara et al. ............ 713/2 |
| 6,910,157 | B1 | * | 6/2005 | Park et al. ....................... 714/36 |
| 2006/0230316 | A1 | * | 10/2006 | Lu et al. ........................ 714/36 |
| 2009/0292911 | A1 | * | 11/2009 | Chien ............................ 713/2 |
| 2010/0100769 | A1 | * | 4/2010 | Wu et al. ........................ 714/36 |

* cited by examiner

*Primary Examiner* — Scott Baderman
*Assistant Examiner* — Joseph D Manoskey
(74) *Attorney, Agent, or Firm* — Altis Law Group, Inc.

(57) ABSTRACT

A boot test apparatus and method can repeatedly execute actions of power-on and power-off for a cold boot test of a computer to test whether the computer is operable. The boot test apparatus includes a microprocessor, a controller, and a power switch. The microprocessor generates a control signal according to a period voltage provided by an internal power supply. The control signal includes a pulse signal and a voltage signal. The controller controls a power switch to send the pulse signal to the computer through a power button of the computer, and controls the power switch to send the voltage signal to the computer through a power input port of the computer. The microprocessor further obtains test information from the computer when the computer executes a cold boot process according to the control signal, and displays the test information on an LED when the cold boot process is abnormal.

11 Claims, 3 Drawing Sheets

BOOT TEST APPARATUS AND METHOD OF COMPUTER SYSTEM

BACKGROUND

1. Technical Field

Embodiments of the present disclosure relate generally to computer system test methods and systems, and more particularly to a boot test apparatus and method of a computer system.

2. Description of Related Art

For manufacturers of computer systems, quality of computers delivered from the factory needs to be under strict control. In order to assure the stability and reliability of computer systems, it is necessary to perform a series of tests before shipping. Among these tests, one of them is a cold boot test operation, whose method is to repeatedly execute actions of power on and power off once in a certain time interval, testing whether the computer boots properly. For example, if a computer is able to start the operating system when the computer is powered on, then it is considered as a normal boot. Likewise, if the computer is able to exit the operating system when the computer is powered off, then it is consider as a normal power-off.

However, the aforesaid approach of computer cold boot test is normally performed by professional testers. During the test, when the computer is not able to boot normally, the current error conditions are not properly displayed or recorded before the next reboot test. As a result, the above-mentioned problems need to be addressed.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
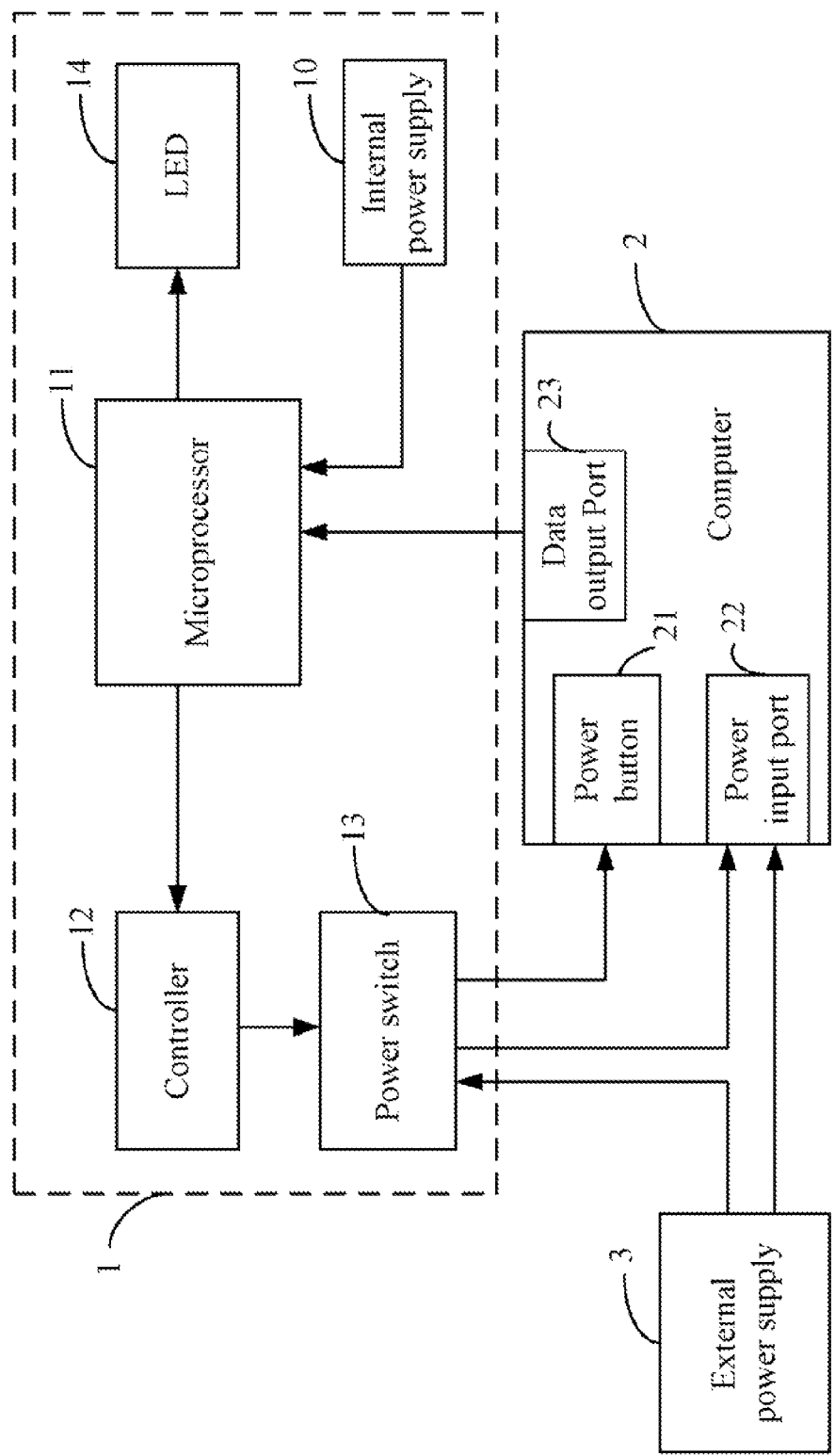
FIG. 1 is a block diagram of one embodiment of a boot test apparatus of a computer.

FIG. 1 is a block diagram of one embodiment of a boot test apparatus 1 of a computer 2. In the embodiment, the boot test apparatus 1 can repeatedly execute actions of power-on and power-off for a cold boot test of the computer 2 to test whether the computer 2 is operable. The cold boot test may include a boot process test and a power-off process test. The boot process test is to test whether the computer 2 can normally start an operating system when the computer 2 is powered on. The power-off process test is to test whether the computer 2 can normally exit the operating system when the computer 2 is powered off.

In one embodiment, the boot test apparatus 1 includes an internal power supply 10, a microprocessor 11, a controller 12, a power switch 13, and a light-emitting diode (LED) 14. The boot test apparatus 1 connects to an external power supply 3 and the computer 2 to be tested through the power switch 13. The external power supply 3 is configured to provide working powers for the computer 2 during the process of the cold boot test of the computer 2. In some embodiment, the computer may be a personal computer, a notebook computer, a server, a workstation computer, or any other electronic device. The computer 2 may include a power button 21, a power input port 22, and a data output port 23. The power switch 13 connects to the computer 2 through the power button 21 and the power input port 22. The microprocessor 11 connects to the computer 2 through the data output port 23.

The internal power supply 10 connects to microprocessor 11, and is configured to provide a period voltage for the microprocessor 11. The period voltage may be 5 volts defined as a high level voltage, or 0 volts defined as a low level voltage. The microprocessor 11 connects to the controller 12, and is configured to generate a control signal according to the period voltage, and sends to the control signal to the controller 12. In the embodiment, the control signal may be a pulse signal and a voltage signal. The pulse signal is sent to the power button 21 for controlling the power button 21 to power on or power off the computer 2. The voltage signal sent to the power input port 22 for controlling the external power supply 3 to power on or power off the computer 2.

Figure 2A:
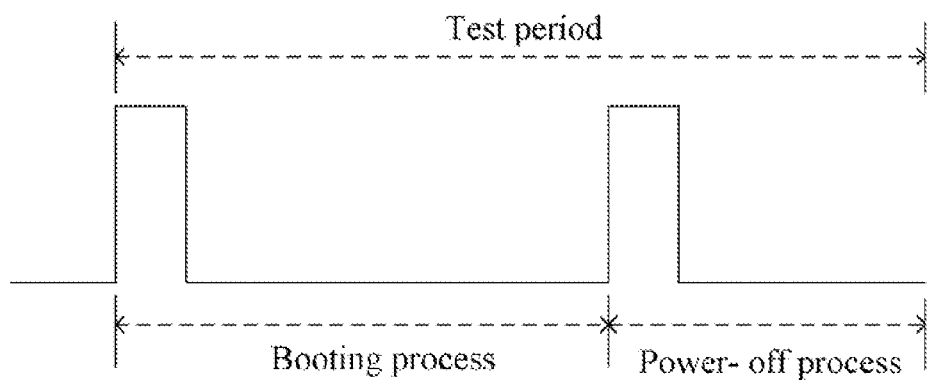
FIG. 2A-2B is a schematic diagram illustrating two examples of a cold boot test period of the computer.
Figure 2B:
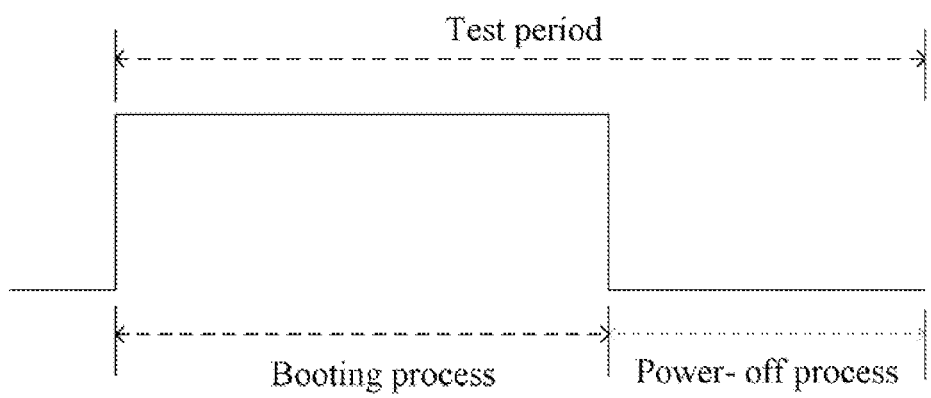

In one example with respect to FIG. 2A, during the test period of the cold boot test, the computer 2 may perform a booting process and a power-off process when the power button 21 receives the pulse signal from the power switch 13. In another example with respect to FIG. 2B, the computer 2 may also perform the booting process and the power-off process when the power input port 22 receives the voltage signal from the power switch 13.

The controller 12 is configured to control the power switch 13 to send the pulse signal to the power button 21, and control the power switch 13 to send the voltage signal to the power input port 22. In the embodiment, the controller 12 enables the power switch 13 to power-on the computer 2 based on the pulse signal, or disenables the power switch 13 to power-off the computer 2 based on the voltage signal.

The computer 2 performs the cold boot test according to the control signal from the power switch 13, and generates test information of the cold boot process correspondingly. In the embodiment, the computer 2 boots the operating system when the power button 21 receives the pulse signal form the power switch 13, and exits the operating system when the power button 21 receives the voltage signal form the power switch 13. During the execution of the cold boot process, the computer 2 generates test information of the cold boot process correspondingly. The test information may be include normal information and abnormal information when the Basic Input/Output System (BIOS) of the computer 2 executes the Power On Self Test (POST). It is understood that the normal information are generated when the computer 2 is workable, and abnormal information are generated when the computer 2 is unworkable.

The microprocessor 11 is configured to obtain the test information from the computer 2 through the data output port 23 during the cold boot process, and determines the cold boot process of the computer 2 is normal according to the test information. When the cold boot process of the computer 2 is abnormal, the microprocessor 11 displays the abnormal information on the LED 14 for indicating the computer 2 experienced an error. The data output port 23 may be a RS-232 interface or a USB interface for transferring the test information from the computer 2 to the microprocessor 11.

Figure 3:
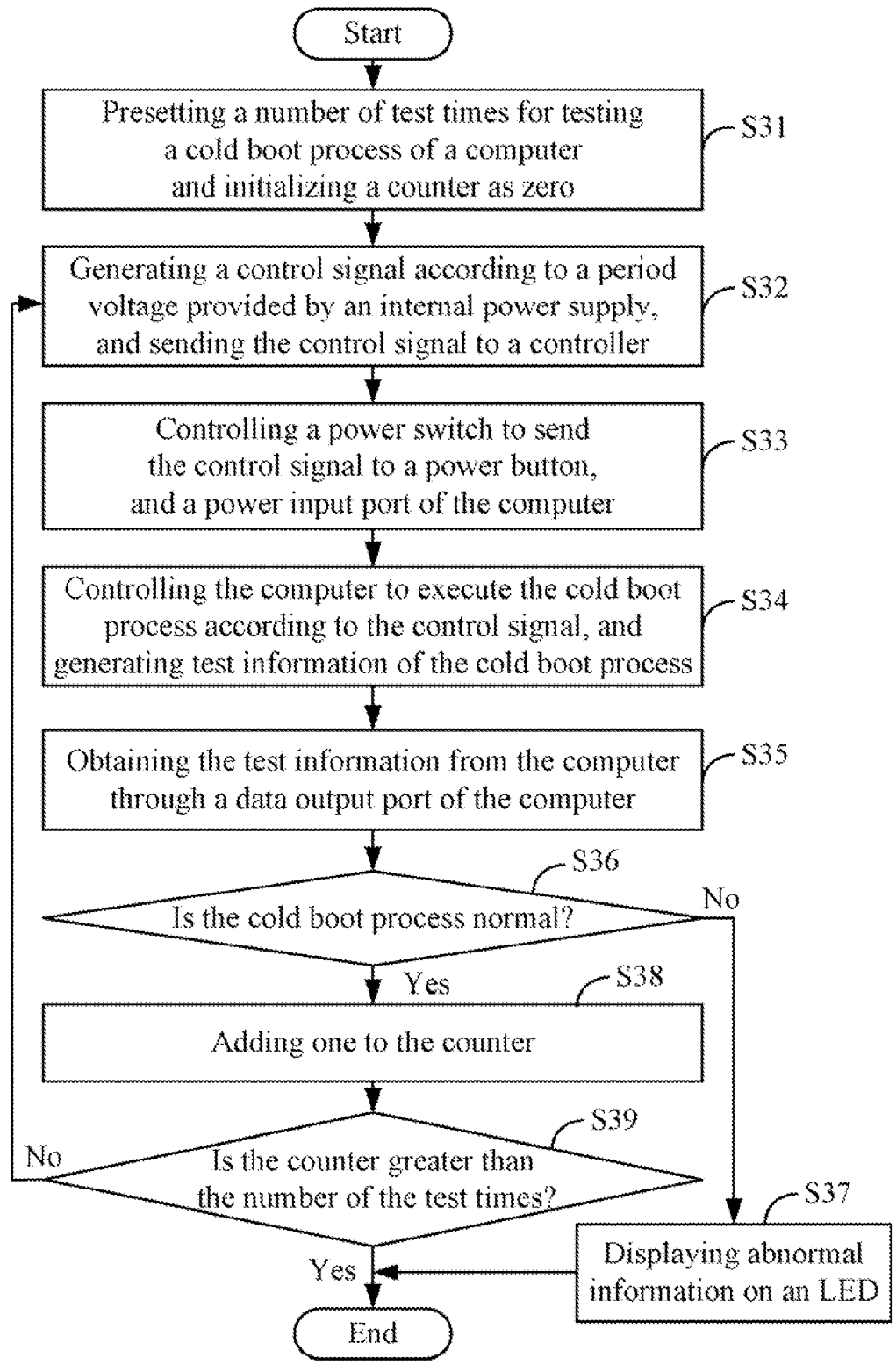
FIG. 3 is a flowchart of one embodiment of a boot test method of a computer using the apparatus of FIG. 1.

FIG. 3 is a flowchart of one embodiment of a boot test method of a computer system using the apparatus 1 of FIG. 1. In the embodiment, the method can repeatedly execute actions of a power-on and power-off for a cold boot test of the computer 2 to test whether the computer 2 is operable. As mentioned above, the cold boot test may include the boot process test and the power-off process test for the computer 2.

In block S31, the microprocessor 11 presets a number of test times for testing the cold boot process of the computer 2, and initialize a counter (denoted as "T") as zero. In one embodiment, the number of test times can be preset as 100 times, for example.

In block S32, the microprocessor 11 generates a control signal according to a period voltage provided by the internal power supply 10, and sends to the control signal to the controller 12. As mentioned above, the control signal may be a pulse signal and a voltage signal. The pulse signal is sent to the power button 21 to power-on or power-off the computer 2. The voltage signal sent to the power input port 22 to control the external power supply 3 to power-on or power-off the computer 2.

In block S33, the controller 12 controls the power switch 13 to send the pulse signal to the power button 21, and controls the power switch 13 to send the voltage signal to the power input port 22. In the embodiment, the controller 12 enables the power switch 13 to power-on the computer 2 based on the pulse signal, or disenables the power switch 13 to power-off the computer 2 based on the voltage signal.

In block S34, the computer 2 performs the cold boot test according to the control signal from the power switch 13, and generates test information of the cold boot process. In the embodiment, the computer 2 boots the operating system when the power button 21 receives the pulse signal form the power switch 13, and exits the operating system when the power button 21 receives the voltage signal form the power switch 13. During the execution of the cold boot process, the computer 2 generates test information of the cold boot process correspondingly. The test information may be include normal information and abnormal information when the Basic Input/Output System (BIOS) of the computer 2 executes the Power On Self Test (POST). The normal information is generated when the computer 2 is workable, and the abnormal information is generated when the computer 2 nonfunctional.

In block S35, the microprocessor 11 obtains the test information from the computer 2 through the data output port 23 during the cold boot process. In block S36, the microprocessor 11 determines the cold boot process of the computer 2 is normal according to the test information. If the cold boot process of the computer 2 is abnormal, block S37 is implemented. Otherwise, if the cold boot process of the computer 2 is normal, block S38 is implemented.

In block S37, the microprocessor 11 displays the abnormal information on the LED 14 to indicate the computer 2 is nonfunctional when the cold boot process is abnormal. In block S38, the microprocessor 11 adds one to the counter, i.e., performs a calculation of T=T+1, once the computer 2 completes the cold boot process for the current test normally. In block S39, the microprocessor 11 checks whether the counter T is greater than the number of test times (e.g., 100 times preset by the microprocessor 11). If the counter is not greater than the test time, block S32 is repeated. Otherwise, if the counter is greater than the test time, the microprocessor 11 stops to generate the control signal and ends the cold boot test flow.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A boot test apparatus of a computer, the computer comprising a power button and a power input port, the apparatus comprising:
    a microprocessor configured to generate a control signal according to a period voltage, the control signal comprising a pulse signal and a voltage signal, wherein the pulse signal is sent to the power button for controlling the power button to power on or power off the computer, and the voltage signal is sent to the power input port for controlling an external power supply to power on or power off the computer; and
    a controller connected to the microprocessor, and configured to control a power switch to send the pulse signal to the computer through the power button, and control the power switch to send the voltage signal to the computer through the power input port;
    wherein the microprocessor is further configured to obtain test information from the computer when the computer executes a cold boot process according to the control signal, determine whether the cold boot process is normal according to the test information, and display abnormal information on an LED when the cold boot process is abnormal.

2. The apparatus according to claim 1, wherein the microprocessor is further configured to preset a number of test times for testing the cold boot process of the computer, add one to a counter once the computer completes the cold boot process, and stop generating the control signal when the counter is greater than the preset number of test times.

3. The apparatus according to claim 1, wherein the controller enables the power switch to power on the computer based on the pulse signal, and disenables the power switch to power off the computer based on the voltage signal.

4. The apparatus according to claim 1, wherein the computer further comprises a data output port for transferring the test information from the computer to the microprocessor.

5. The apparatus according to claim 4, wherein the data output port is an RS-232 interface or a USB interface.

6. The apparatus according to claim 1, further comprising an internal power supply to provide the period voltage.

7. A boot test method of a computer, the computer comprising a power button and a power input port, the method comprising:
    generating a control signal by a microprocessor according to a period voltage provided by an internal power supply, the control signal comprising a pulse signal and a voltage signal, wherein the pulse signal is sent to the power button for controlling the power button to power on or power off the computer, and the voltage signal is sent to the power input port for controlling an external power supply to power on or power off the computer;
    sending to the control signal to a controller connected to the microprocessor;
    controlling a power switch to send the pulse signal to the computer through the power button, and send the voltage signal to the computer through the power input port;
    obtaining test information from the computer when the computer executes a cold boot process according to the control signal;
    determining whether the cold boot process of the computer is normal according to the test information; and
    displaying abnormal information when the cold boot process is abnormal.

8. The method according to claim 7, further comprising:
presetting a number of test times for testing the cold boot process of the computer;
adding one to a counter once the computer completes the cold boot process for the current test normally; and
stopping generating the control signal when the counter is greater than the number of preset test times.

9. The method according to claim 7, wherein the controller enables the power switch to power on the computer based on the pulse signal, and disenables the power switch to power off the computer based on the voltage signal.

10. The method according to claim 7, wherein the computer further comprises a data output port for transferring the test information from the computer to the microprocessor.

11. The method according to claim 10, wherein the data output port is an RS-232 interface or a USB interface.

* * * * *